Patented May 30, 1933

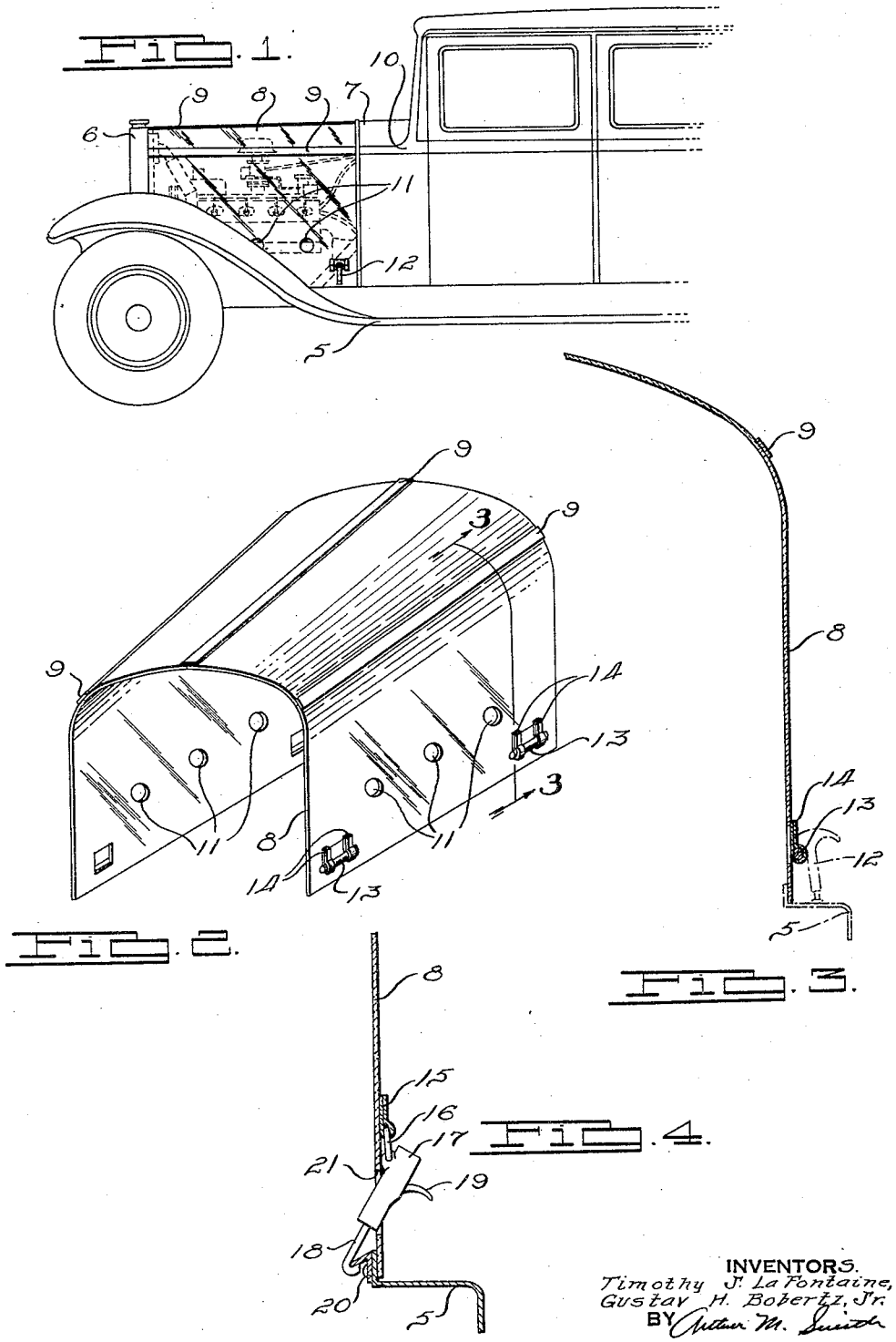

1,911,600

UNITED STATES PATENT OFFICE

GUSTAV H. BOBERTZ, JR., AND TIMOTHY J. LA FONTAINE, OF DETROIT, MICHIGAN

AUTOMOBILE HOOD

Application filed November 22, 1932. Serial No. 643,936.

Our invention relates to an automobile hood and more particularly to such a hood formed of a transparent material.

In connection with the advertising and sales promotion of various mechanical devices, particularly motor vehicles, much emphasis has been placed upon details of mechanical features and mechanical operation. As a result of such emphasis the purchasing public has become greatly interested in matters of details pertaining to the construction of engines, their mounting in the motor vehicle, and other related features of motor vehicle construction. It is conventional practice to enclose the engine of a motor vehicle with a solid metallic hood, which must be raised whenever the prospective purchaser desires to investigate matters pertaining to engine construction, mounting and operation. Even then the raising of the conventional type hood does not afford complete visibility of such matters because in the conventional construction but one side at a time can be fully raised to permit inspection of that particular side of the engine. If both sides are raised at the same time the hood extends high above the engine and prevents ready visibility of the top portion of the engine.

Recent developments in the designing of bodies for motor vehicles have emphasized a trimness of line and a unity of design, which also is urged upon the prospective purchaser by advertising as well as by the car salesmen. The use of the conventional type hood in the demonstration of a motor vehicle, particularly when the purchaser is desirous of seeing the engine under the hood, destroys much of the argument in favor of the neatness of body design because the raising of the hood on a display car breaks the line in a manner which detracts from the appearance of the entire car.

Many persons in charge of the display of motor vehicles have realized this defect and have attempted to obviate it by the entire removal of the hood of the motor vehicle. This likewise gives rise to many unsatisfactory results as it leaves the motor entirely unprotected from dust, moisture and the like, and also is very dangerous where the demonstration includes the starting of the motor and its operation for a period of time, because of the fact that many of the moving parts of the motor are exposed without any barrier between such parts and a person observing the operation of the motor.

A transparent hood also has been found very helpful in the study of the flow of air currents through the radiator and around the engine of a motor vehicle. Such a transparent hood permits the observer to note the flow of the air stream under conditions the same as the conditions when a conventional type metallic hood is used.

It is, therefore, an object of our present invention to provide an automobile hood formed of transparent material, which permits full visibility of the engine of a motor vehicle at all times.

This and various other objects, features of arrangement, construction and operation are plainly shown and described and will be best understood by reference to the accompanying drawing showing a preferred embodiment of our invention, in which:

Fig. 1 is a fragmentary side elevation of the forward portion of a motor vehicle on which is placed a hood embodying our invention;

Fig. 2 is a view in perspective of a hood embodying our invention;

Fig. 3 is a sectional view taken on the line 3—3 of Fig. 2;

Fig. 4 is a fragmentary sectional view showing a modification of the means for holding a hood embodying our invention.

Similar reference numerals refer to similar parts throughout the several views.

Referring more in detail to the drawing, 5 designates a motor vehicle of any conventional type having a radiator shell 6 and a cowl 7. Supported by the radiator shell 6 and the cowl 7 is a hood 8. The hood 8 is formed of a transparent material, such as a heavy celluloid or the like, and is of a sufficient length to contact the radiator shell 6 and the cowl 7 of the motor vehicle 5 and to be supported thereby.

The sides of the hood 8 conform in shape to the shape of the radiator shell 6 and extend downwardly for a sufficient distance to completely enclose the portion of the vehicle between the radiator shell 6 and the cowl 7. As shown more in detail in Fig. 2, the hood 8 is provided with a plurality of reinforcing ribs 9, which may be so placed on the hood as to carry out the design of the motor vehicle body which may include a moulding 10.

The hood 8 in accordance with our invention, may be formed of a single sheet of transparent material, or it may be formed of a plurality of independent sheets of such material as is here shown, in which case the reinforcing ribs 9 may be placed at the point of connection between the separate sheets used in the fabrication of the hood and so cover the seam which results from the joining of such sheets. The reinforcing ribs 9 preferably are formed of the same material as the body portion of the hood, but may also be formed of any other desired material.

A plurality of openings 11 may be placed on each side of the hood embodying our invention to provide for the flow of air through the hood. Such openings may be of any desired size or shape and may correspond to the size and shape of the openings provided in the conventional hood which is replaced by the hood embodying our invention for the purposes of display or study of the motor vehicle upon which it is mounted.

The hood embodying our invention is adapted to be used with any of the conventional hood latches which may be employed. One form of such latch is designated by the numeral 12 in Figs. 1 and 3, and consists of a spring-tensioned hook member secured to a portion of the motor vehicle 5 adjacent the point of contact of the hood 8 with the motor vehicle 5. Such hood latches, as is well known, engage a portion of a hood and hold the hood in place by the pressure exerted thereon by the spring contained within the latch 12.

In order to permit the attachment of a hood embodying our invention by means similar to the latch 12, a plurality of members 13 is secured to the hood by any desired means, such for example as a plurality of loops 14 secured to the face of the hood 8 and extending around the members 13. When this type of hood fastening is employed, the hood latches such as the hood latch 12 engage the members 13 secured to the hood, and the tension of the springs in the hood latches 12 holds the hood securely in position.

The hood 8 embodying our invention may likewise be held in place by any other type of hood latch which may be employed to hold the conventional hood in place. In Fig. 4 we have shown a hood embodying our invention adapted for use with a hood latch of another known type. In the hood latch of the type shown in Fig. 4, the hood latch is secured to the hood 8 by means of a looped member 15 carrying a ring 16, to which the hood latch 17 is secured. The hood latch 17 is formed with a body portion in which a spring actuated hook member 18 is mounted, the member 18 terminating in a handle portion 19 to permit the fastening and unfastening of the hood latch 17. A flange 20 is secured to a portion of the motor vehicle 5 adjacent the inner side of the hood 8, and an opening 21 extends through the side of the hood 8 adjacent the flange 20, the opening 21 being of a sufficient size to permit the passage therethrough of a portion of the hood latch 17.

The operation of a device embodying our invention is as follows: If a motor vehicle is to be used for purposes of display or study, and it is desirable to afford the observer a full visibility of the engine, the conventional type hood is removed entirely from the vehicle and a hood embodying our invention is placed thereon in its stead. The means for holding the conventional type hood in position are employed with the hood embodying our invention, and the spring tension of such hood latches as may be employed is sufficient to hold the hood in place in such a manner as not to affect adversely the appearance of the entire motor vehicle. The hood also is held in position with sufficient firmness so that the engine is protected at all times, even during the operation of the motor vehicle, from dust, moisture and the like.

It is apparent from the foregoing that a hood embodying our invention may be so constructed as to replace the conventional type hood on a motor vehicle used for purposes of display or study, and may be so adapted by any mechanic skilled in the art. Likewise it is apparent that any conventional method for holding a hood in place may be employed for holding in place the hood embodying our invention. We do not, therefore, desire to be limited to any particular type of a hood fastening means, nor to a particular shape or configuration of such a hood, but desire to avail ourselves of all changes in the scope of the appended claims.

Having thus described our invention, what we claim is new and desire to secure by Letters Patent of the United States is:

1. An automobile hood including two transparent vertical members, two substantially horizontal transparent members, a plurality of longitudinally extending transparent reinforcing means connecting the adjoining edges of said members to form a unitary structure therefrom, and securing means adapted to coact with a hold-down latch on the vehicle body to removably secure the said hood to the vehicle body.

2. An automobile hood including a plurality of transparent members forming two substantially vertical sides and a substantially horizontal top portion, a plurality of transparent longitudinally extending reinforcing means connecting said plurality of transparent members, and means secured to said hood and adapted to coact with means on the vehicle body to removably secure said hood in place on said body.

3. An automobile hood including two transparent vertical members, two substantially horizontal transparent members, a plurality of longitudinally extending transparent reinforcing means connecting the adjoining edges of said vertical members and said horizontal members and the adjoining edges of said horizontal members, and disposed to conform with the body design of the motor vehicle upon which the hood is placed, and securing means secured to said hood and adapted to coact with a hold-down latch on the vehicle body.

4. An automobile hood including two transparent vertical members, two substantially horizontal transparent members, a plurality of longitudinally extending transparent reinforcing means connecting the adjoining edges of said members to form a unitary structure therefrom, and means secured to said hood and adapted to permit removable attachment of said hood to a motor vehicle body.

5. An automobile hood including a plurality of transparent members forming two substantially vertical sides, and a substantially horizontal top portion, a plurality of reinforcing means connecting said plurality of transparent members, and means secured to said hood and adapted to coact with means on the vehicle body to removably secure said hood in place on said body.

In witness whereof, we hereunto subscribe our names this 17th day of November, A. D. 1932.

GUSTAV H. BOBERTZ, Jr.
TIMOTHY J. LA FONTAINE.